(12) United States Patent
Akutsu et al.

(10) Patent No.: US 7,675,206 B2
(45) Date of Patent: Mar. 9, 2010

(54) ROTATING ELECTRIC MACHINE AND MANUFACTURING METHOD THEREOF

(75) Inventors: Satoru Akutsu, Tokyo (JP); Kyouhei Yamamoto, Tokyo (JP); Shinsuke Hemmi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 698 days.

(21) Appl. No.: 11/483,719

(22) Filed: Jul. 11, 2006

(65) Prior Publication Data
US 2007/0063596 A1    Mar. 22, 2007

(30) Foreign Application Priority Data
Sep. 16, 2005    (JP) .......................... P2005-270233

(51) Int. Cl.
  *H02K 11/00* (2006.01)
  *H02K 7/20* (2006.01)
  *H02K 23/60* (2006.01)
(52) U.S. Cl. ..................... 310/71; 310/89; 310/112; 310/115
(58) Field of Classification Search .............. 310/71, 310/89, 112, 115
See application file for complete search history.

(56) References Cited

U.S. PATENT DOCUMENTS

| | | | | |
|---|---|---|---|---|
| 4,050,771 | A * | 9/1977 | Watson et al. ............... | 439/736 |
| 6,707,185 | B2 * | 3/2004 | Akutsu et al. ................ | 310/71 |
| 6,750,574 | B2 | 6/2004 | Okazaki et al. | |
| 6,856,056 | B2 * | 2/2005 | Lyle et al. ..................... | 310/71 |
| 7,071,588 | B1 * | 7/2006 | Khazanov ..................... | 310/71 |
| 2002/0053841 | A1 * | 5/2002 | Asao ........................ | 310/68 B |
| 2002/0175574 | A1 | 11/2002 | Okazaki et al. | |
| 2005/0179329 | A1 * | 8/2005 | Okazaki et al. ............... | 310/71 |
| 2005/0269895 | A1 * | 12/2005 | Innami et al. ................ | 310/218 |

(Continued)

FOREIGN PATENT DOCUMENTS

CN    1388627 A    1/2003

(Continued)

OTHER PUBLICATIONS

Japanese Office Action for JP-A-2005-270233 dated Mar. 13, 2008.

(Continued)

*Primary Examiner*—Quyen Leung
*Assistant Examiner*—Jose A Gonzalez Quinones
(74) *Attorney, Agent, or Firm*—Sughrue Mion, PLLC

(57) ABSTRACT

A rotating electric machine which includes: a stator having a stator core fixed inside a bottomed frame and a stator winding wound around the stator core; a bracket fixed to an opening side of the frame; a rotor having a shaft penetrating the bracket and rotatably supported by a bracket side bearing and by a frame side bearing, the rotor being arranged inside the stator core interposing a gap therebetween; a respective phase lead wire electrically connected to the stator winding and led out from the bracket; a rotation sensor that detects a rotational position of the rotor; and a sensor signal wire connected to the rotation sensor and led out from the bracket. A front end portion of the respective phase lead wire is introduced to inside the bracket from outside an opening portion provided at the bracket, thereby electrically connecting to the stator winding.

8 Claims, 7 Drawing Sheets

U.S. PATENT DOCUMENTS

2006/0063418 A1* 3/2006 Motzigkeit .................. 439/425
2007/0210658 A1* 9/2007 Terauchi et al. ........... 310/68 B

FOREIGN PATENT DOCUMENTS

| | | |
|---|---|---|
| CN | 1655422 | 8/2005 |
| JP | 9-322467 A | 12/1997 |
| JP | 2000-116055 A | 4/2000 |
| JP | 2002-84699 A | 3/2002 |
| JP | 2002-112482 A | 4/2002 |
| JP | 2002-354755 A | 12/2002 |
| JP | 2004-323019 A | 11/2004 |
| JP | 2005-210837 A | 8/2005 |
| JP | 3881351 B2 | 11/2006 |
| WO | WO 2005099068 A1 * | 10/2005 |

OTHER PUBLICATIONS

Chinese Office Action for CN 200610108528.6 dated Jan. 9, 2009.

* cited by examiner

ROTATING ELECTRIC MACHINE AND MANUFACTURING METHOD THEREOF

BACKGROUND OF THE INVENTION

1. Field of the Invention

The present invention relates to a rotating electric machine having respective phase lead wires and a sensor signal wire and manufacturing method thereof.

2. Description of the Related Art

There is an apparatus of a background art including respective phase lead wires and a plurality of bundled sensor signal wires penetrated through a grommet, and a connection board for connecting the respective phase lead wires and a wire connecting board, in which the respective phase lead wires are welded to be connected to respective phase terminals of the connection board on a side of the lead wires, the connection board is fixed to a bracket by using a screw, successively, a frame fixed with a stator is fixed to the bracket by using a bolt to cover an essential portion of a motor by the frame and the bracket (refer to, for example, JP-A-2002-354755 (paragraphs [0018] to [0022], FIGS. 1 to 5)).

According to the apparatus of the background art, the respective phase lead wires and the sensor signal wires are penetrated through a single one of the grommet, the respective phase lead wires are welded to be connected to the connection board, the connection board is fixed to the bracket by using the screw, thereafter, the frame is fixed to the bracket by using the bolt to thereby cover the essential portion of the rotating electric machine by the frame and the bracket and therefore, after integrating the rotating electric machine, the respective phase lead wires cannot easily be interchanged, for example, parts of the rotating electric machine cannot easily be used commonly such that when a rotating electric machine having different lead out lengths of respective phase lead wires is needed, it is necessary to newly integrate the rotating electric machine. Further, the respective phase lead wires are deficient in flexibility since a wire diameter thereof is comparatively bold, in a case of long lead out lengths of the respective phase lead wires, when the respective phase lead wires are integrated at an early stage of an integrating step, operability of the integrating step thereafter is deteriorated or an integrated apparatus is large-sized to thereby pose a problem of deteriorating productivity. Further, the respective phase lead wires and the plurality of bundled sensor signal wires are penetrated through the single grommet and therefore, an influence of a state of arranging the respective phase lead wires led out, having a comparatively bold wire diameter and deficient in the flexibility is effected, a force of deforming the grommet is operated from the respective phase lead wires, particularly, there is a concern of deteriorating waterproof performance of a portion of leading out the sensor signal wires having a comparatively slender wire diameter and bundled with a plurality of the lead wires.

SUMMARY OF THE INVENTION

The invention provides a rotating electric machine improving integrating operability of the rotating electric machine, having excellent productivity such that parts thereof can commonly be used and capable of promoting waterproof performance of a portion thereof for leading out a lead wire.

According to an aspect of the present invention, a rotating electric machine includes: a stator having a stator core fixed inside a bottomed frame and a stator winding wound around the stator core; a bracket fixed to an opening side of the frame; a rotor having a shaft penetrating the bracket and rotatably supported by a bracket side bearing fixed to the bracket and by a frame side bearing arranged at the frame, the rotor being arranged inside the stator core interposing a gap therebetween; a respective phase lead wire electrically connected to the stator winding and led out from the bracket; a rotation sensor fixed to the bracket that detects a rotational position of the rotor; and a sensor signal wire connected to the rotation sensor and led out from the bracket. The respective phase lead wire and the sensor signal wire are led out from portions of the bracket different from each other. A front end portion of the respective phase lead wire is introduced to inside the bracket from outside an opening portion provided at the bracket, thereby electrically connecting to the stator winding from outside the bracket.

According to another aspect of the present invention, a method of manufacturing a rotating electric machine, which includes: a stator having a stator core fixed inside a bottomed frame and a stator winding wound around the stator core; a bracket fixed to an opening side of the frame; a rotor having a shaft penetrating the bracket and rotatably supported by a bracket side bearing fixed to the bracket and by a frame side bearing arranged at the frame, the rotor being arranged inside the stator core interposing a gap therebetween; a respective phase lead wire electrically connected to the stator winding and led out from an opening portion of the bracket; a rotation sensor fixed to the bracket that detects a rotational position of the rotor; and a sensor signal wire connected to the rotation sensor and led out from a portion of the bracket different from portions of the respective phase lead wires, the method includes: a step of leading out the sensor signal wire from inside to outside the bracket; a step of covering inside the bracket by the frame and fixing the bracket and the frame; and a step of introducing a front end portion of the respective phase lead wire from outside the opening portion of the bracket to inside the bracket, and electrically connecting the front end portion to the stator winding from outside the bracket.

According to the invention, the respective phase lead wires and the sensor signal wire are led out from portions of the bracket different from each other, further, the respective phase lead wires are constituted such that the front end portions are introduced to inside the bracket from outside the opening portion provided at the bracket to be able to be electrically connected the stator winding from outside the bracket and therefore, there can be provided the rotating electric machine in which after covering an essential portion of the rotating electric machine by the frame and the bracket, the respective phase lead wires can be integrated from outside the rotating electric machine and therefore, integrating operability of the rotating electric machine is promoted, productivity thereof is improved such that parts can commonly be used, and waterproof performance of the lead wire lead out portion is promoted.

Further, there are provided the step of leading out the sensor signal wire from inside to outside the bracket, the step of covering inside the bracket by the frame and fixing the bracket and the frame, the step of introducing the front end portions of the respective phase lead wires from outside the opening portion of the bracket to inside the bracket and electrically connecting the front end portions to the stator winding from outside the bracket and therefore, after covering the essential portion of the rotating electric machine by the frame and the bracket, the respective phase lead wires can be integrated from outside the rotating electric machine and therefore, there can be provided the method of manufacturing the rotating electric machine promoting the integrating operability of the rotating electric machine and improving the productivity such that parts can commonly be used.

DETAILED DESCRIPTION OF THE INVENTION

Embodiment 1

Figure 1:
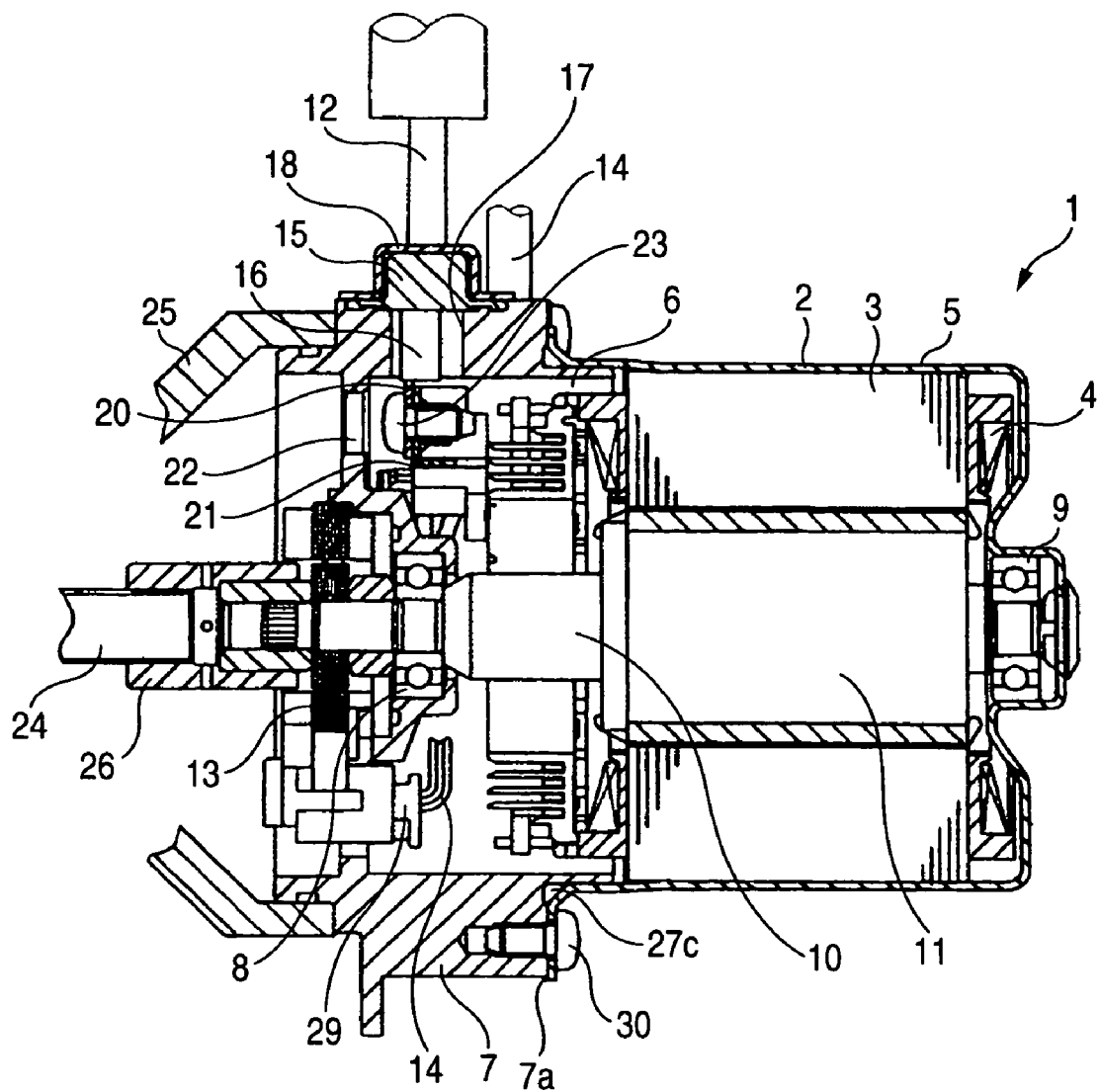
FIG. 1 is a sectional view of an electric power steering apparatus showing Embodiment 1 of the invention.
Figure 2:
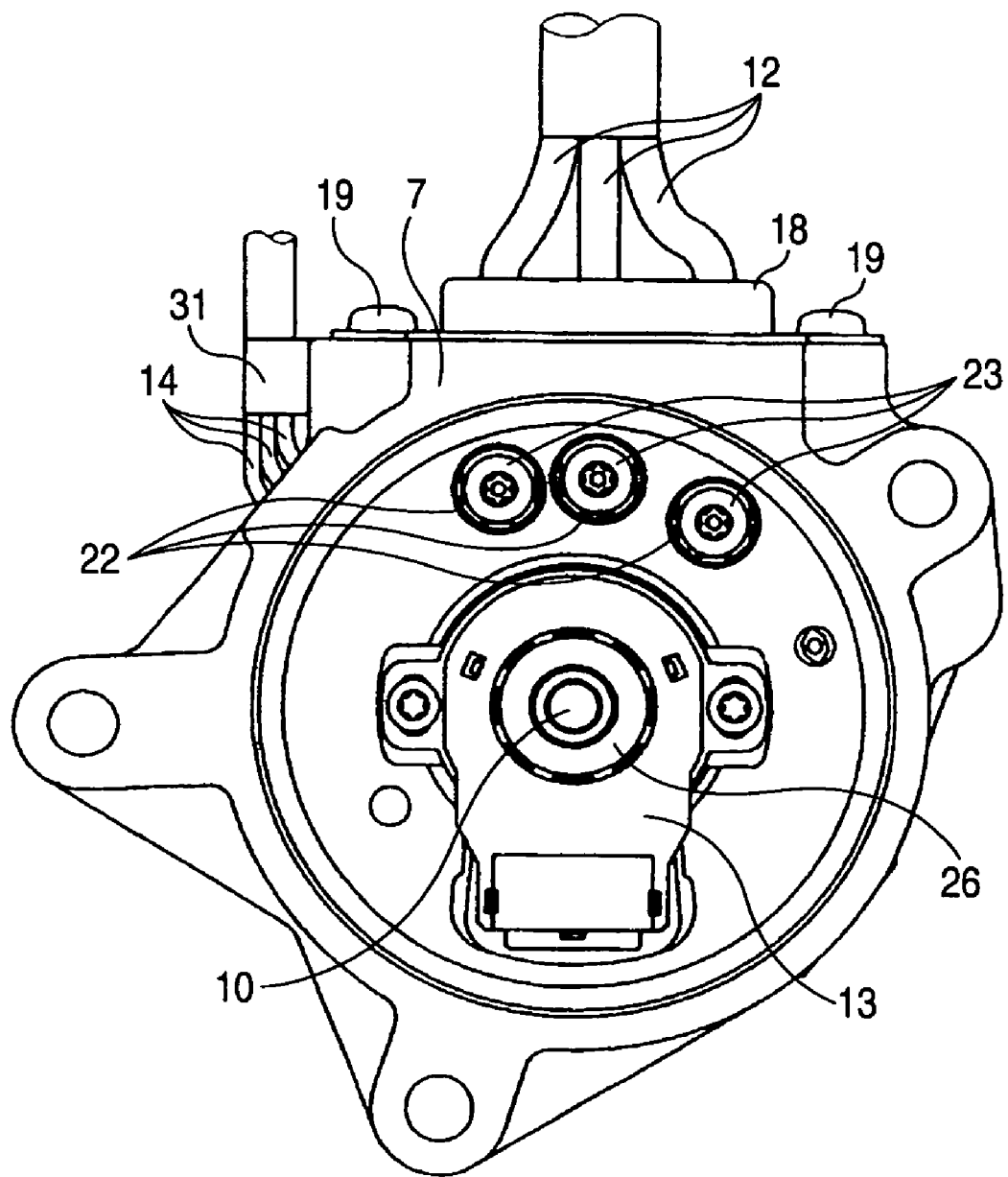
FIG. 2 is a side view of a brushless motor showing Embodiment 1 of the invention.

Embodiment 1 will be explained in reference to FIGS. 1 to 8. Further, an explanation will be given by attaching the same notations to the same or corresponding portions in the respective drawings. FIG. 1 is a sectional view of an electric power steering apparatus showing a brushless motor for an electric power steering apparatus as an example of a rotating electric machine. FIG. 2 is a side view viewing the brushless motor of FIG. 1 from a side of a housing. The brushless motor 1 is fixed with a stator core 3 constituted by laminating electromagnetic steel sheets on an inner peripheral side of a bottomed frame 2 formed by a steel plate, and includes a stator S having a stator winding 4 constituted by winding a coil around the stator core 3. An outer diameter of the frame 2 is about 80 mm, an opening side 6 thereof is fixed with a bracket 7 formed by aluminum diecasting, including a rotor 11 having a shaft 10 penetrating the bracket 7 and rotatably supported by a bracket side bearing 8 fixed to the bracket 7 and a frame side bearing 9 arranged at a bottom portion of the frame 2 and arranged on an inner peripheral side of the stator core 3 by interposing a gap therebetween 3 pieces of respective phase lead wires 12 electrically connected to the stator wiring 4 are led out from the bracket 7 to outside the motor, and 3 pieces of the led-out respective phase lead wires 12 are bundled by covering a tube therearound. A rotation sensor 13 for detecting a rotational position of the rotor 11 is constituted by a resolver and a stator thereof is fixed to an outer side face of the bracket 7 and is attached to be able to adjust a position of the resolver from an outer side of the bracket 7. 6 pieces of sensor signal wires 14 connected to the rotation sensor 13 are led out the rotor from a portion of the bracket 7 which is different from a portion thereof of leading out the respective phase lead wires 12, and 6 pieces of the led-out sensor signal wires 14 are bundled by covering a tube therearound.

The respective phase lead wires 12 are constituted by leading out lead wires having, for example, a nominal sectional area of 8 square mm of low voltage electric wires (AV lines) for an automobile to outside the motor by about 0.9 m. The respective phase lead wires 12 are inserted into a hole portion provided at a grommet 15 comprising an elastic member formed by a rubber material or the like and front end portions 16 of the respective phase lead wires 12 are constituted to be introduced from outside to inside the bracket 7 through a hole-like opening portion 17 provided at a side face in a diameter direction of the bracket 7. The grommet 15 is arranged to close the hole-like opening portion 17 from outside the bracket 7, and by fastening a cover 18 formed by steel plate by 2 pieces of screws 19 from outside the bracket 7, the grommet 15 is pressed to be fixed to the opening portion 17. The front end portions 16 of the respective phase lead wires 12 include connection terminals 20 electrically connected to the respective phase lead wires 12. The connection terminal 20 is electrically connected to a relay board 21 electrically connected to the stator winding 4 and arranged inside the bracket 7 from outside the bracket 7 by screws 23 by fastening screwed holes 22 provided to the bracket 7 from an axial direction. In this way, the front end portions 16 of the respective phase lead wires 12 are introduced from outside to inside the bracket 7 and constituted to be able to be electrically connected to the stator winding 4 from outside the bracket 7.

The bracket 7 of the brushless motor 1 is fitted to be arranged to a housing 25 containing a driven shaft 24 transmitted with a rotational force of the brushless motor. A boss 26 including a spline at an inner peripheral face thereof is press-fitted to be fixed to a front end portion of the shaft 10 penetrating the bracket 7 of the brushless motor 1, and the boss 26 and the driven shaft 24 are connected by engaging the spline. The screwed hole 22 penetrated to be provided to inside the bracket 7 from a face of the bracket 7 on a side of the housing 25 is covered by the housing 25 by attaching the bracket 7 to the housing 25.

Figure 3:
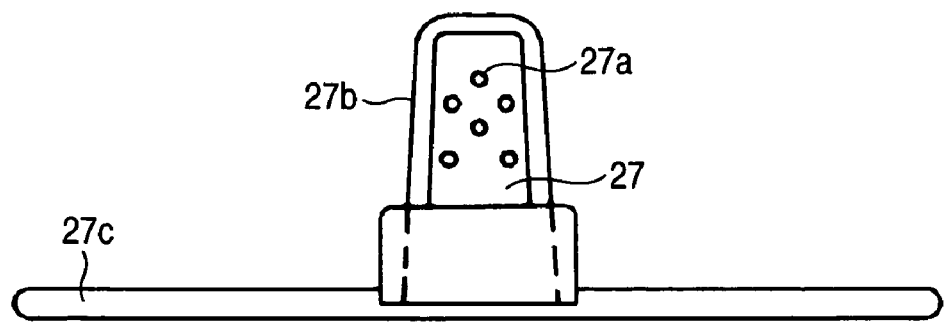
FIG. 3 is a front view of a grommet showing Embodiment 1 of the invention.
Figure 4:
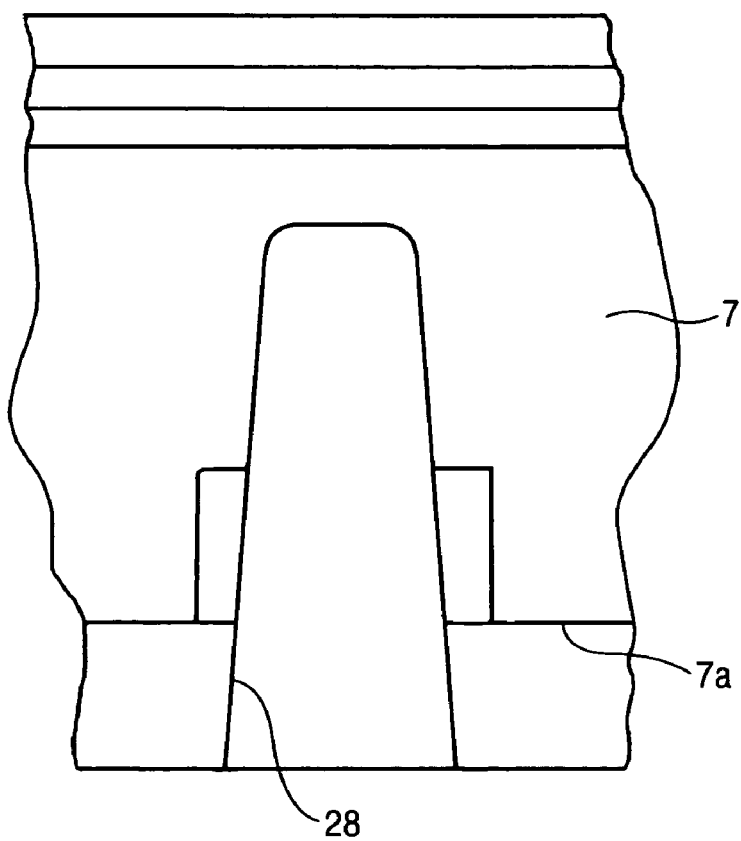
FIG. 4 is a partial side view of a bracket showing Embodiment 1 of the invention.

FIG. 3 is a front view of a grommet inserted with the sensor signal wires, FIG. 4 is a partial side view of the bracket showing a notch portion provided at a side face of the bracket. The sensor signal wires 14 are constituted by leading out lead wires having, for example, a nominal sectional area of 0.5 square mm of low voltage electric wires (AV wires) for an automobile by about 0.9 m to outside the motor. Front ends of the led-out sensor signal wires 14 are attached with a connector connected to a control apparatus. The sensor signal wires 14 are constituted by a plurality of lead wires, and the lead wires of the sensor signal wires 14 are inserted to hole portions 27a provided at a grommet 27 comprising an elastic member formed by a rubber material or the like respectively piece by piece with a fastening margin. According to the embodiment, 6 pieces of the lead wires are respectively inserted into 6 pieces of the hole portions 27a. Further, also the respective phase lead wires 12 are similar thereto, the respective phase lead wires 12 are constituted by a plurality of lead wires and the lead wires of the respective phase lead wires 12 are inserted into hole portions provided at the grommet 15 respectively piece by piece. According to the embodiment, 3 pieces of the lead wires are inserted into 3 pieces of the hole portions respectively piece by piece with a fastening margin.

A face 7a which is a side face in a diameter direction of the bracket 7 and brought into contact with the frame 2 is formed with a notch portion 28 constituted by a taper shape opened to a side of the frame 2. The notch portion 28 is arranged with the grommet 27 inserted with the sensor signal wire 14, and the sensor signal wire 14 is led out the bracket 7. Further, a front end of the sensor signal wire 14 on a side of the brushless motor 1 is provided with a connector 29, and the sensor signal wire 14 is electrically connected to the rotation sensor 13 by way of the connector 29 inside the bracket 7. After leading out the sensor signal wire 14 in this way, by fitting the opening side 6 of the frame 2 to the bracket 7 and fastening a bolt 30, an essential portion of the motor is covered by the frame 2 and the bracket 7, the grommet 27 is pressed in the axial direction by an end face of the frame 2 and pinched between the bracket 7 and the frame 2 to be fixed. The grommet 27 includes a taper face 27b are adapted to the notch portion 28 and is firmly fixed thereto to be able to promote waterproof performance. Further, the grommet 27 is integrally formed with an O ring portion 27c, a number of parts is small, the grommet 27 is compressed to be held over an entire periphery of a portion of fitting the bracket 7 of the frame 2 to be able to promote waterproof performance of the portion.

Figure 5:
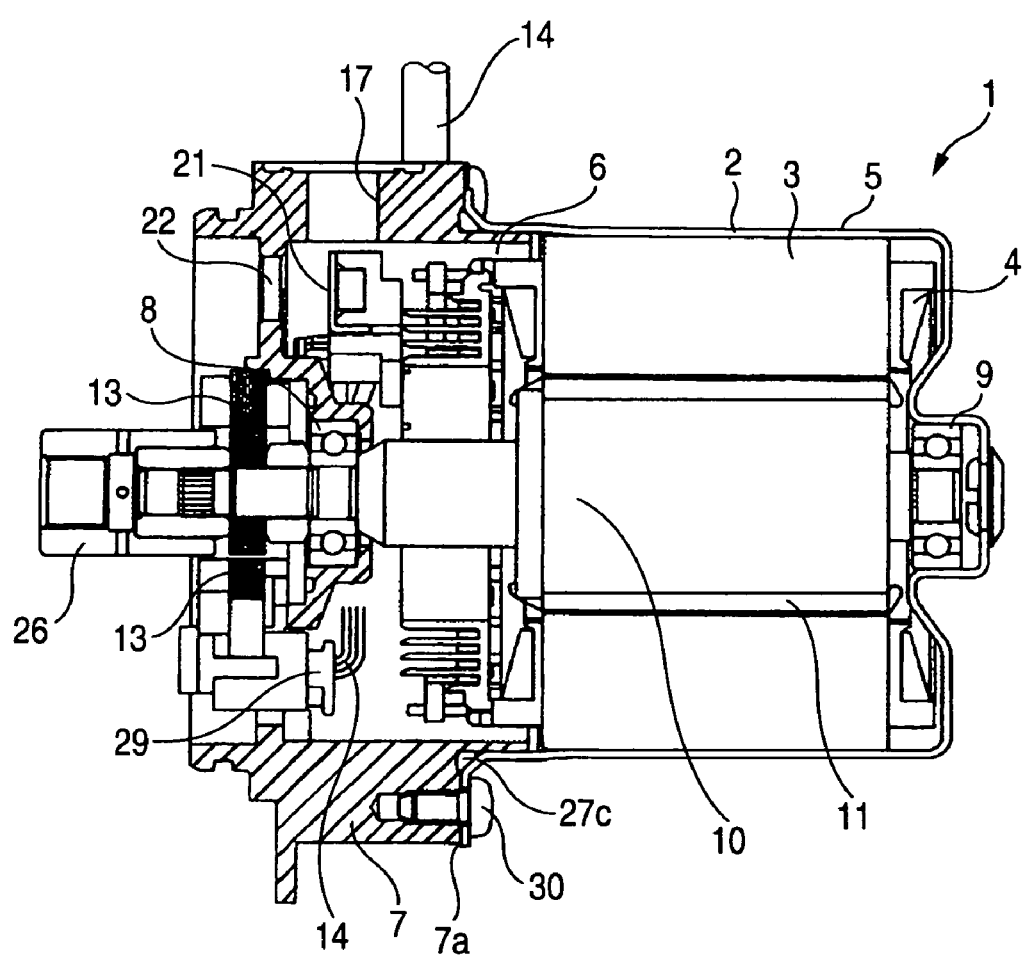
FIG. 5 is a sectional view of the brushless motor showing a middle stage of an integrating step showing Embodiment 1 of the invention.
Figure 6:
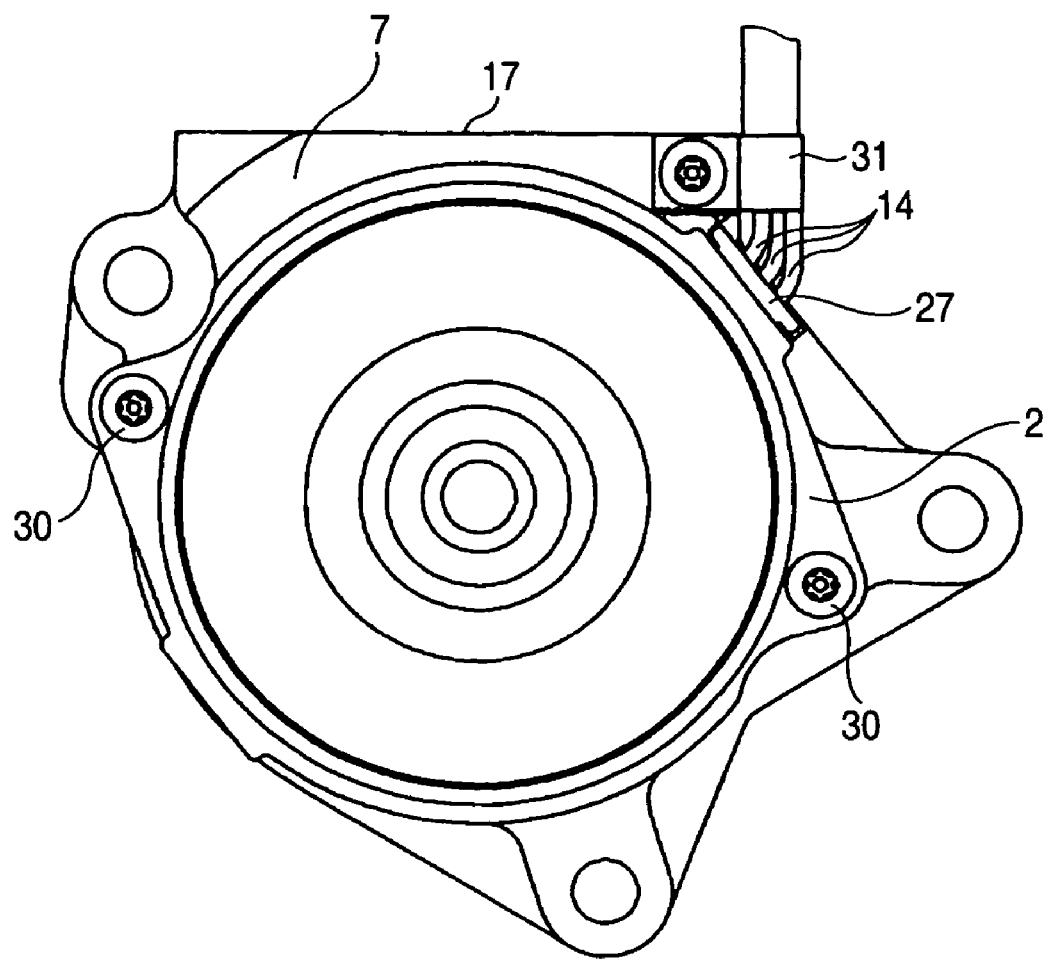
FIG. 6 is a side view of the brushless motor showing a middle stage of the integrating step showing Embodiment 1 of the invention.
Figure 7:
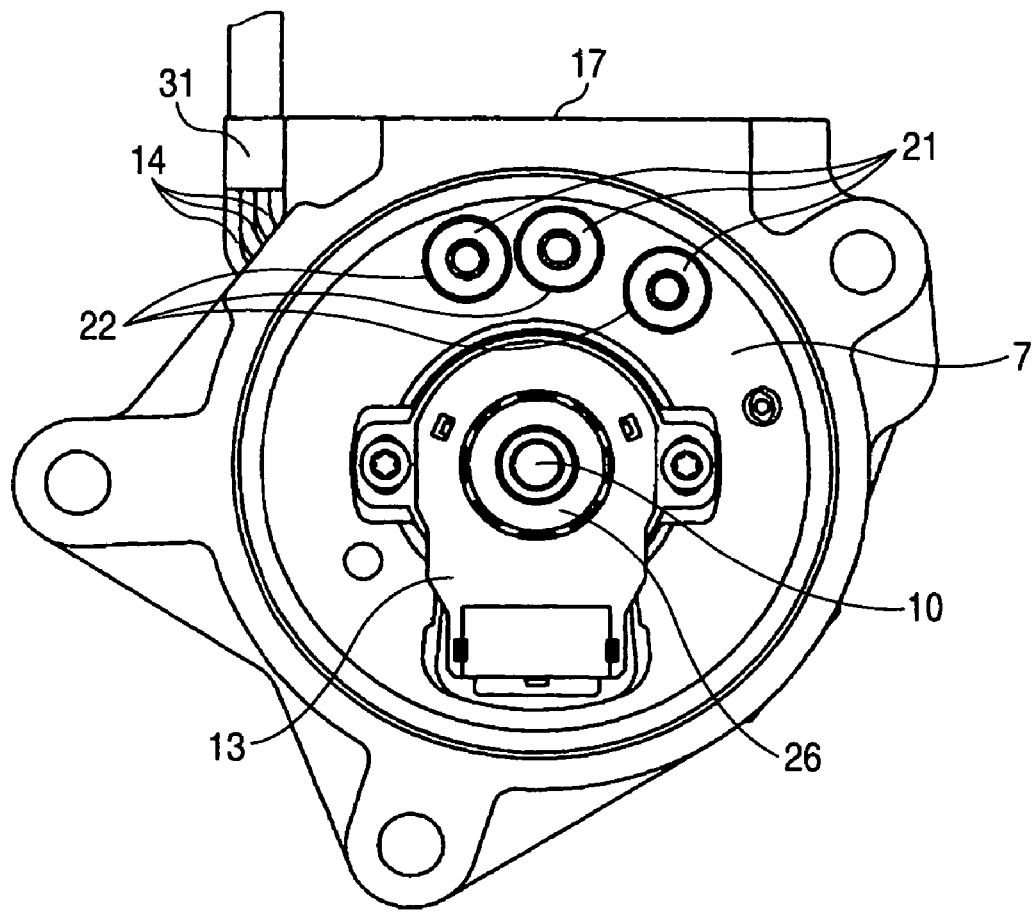
FIG. 7 is a side view of the brushless motor showing a middle stage of the integrating step showing Embodiment 1 of the invention.

FIGS. 5 to 7 show middle stages of a step of integrating the brushless motor, FIG. 5 is a sectional view thereof, FIG. 6 is a side view viewed from a frame side, and FIG. 7 is a side view viewed from a housing side. As described above, FIGS. 5 to 7 show an integrated state when after a step of leading out the sensor signal wire 14 from inside to outside the bracket 7, there is carried out a step of covering inside the bracket 7 by the frame 2 and fastening to fix the bracket 7 and the frame 2 by the bolt 30, showing a state of covering the essential portion of the brushless motor 1 by the frame 2 and the bracket 7. The led-out sensor signal wire 14 is held by a clamp 31, the clamp 31 is fixed to the bracket 7 by a screw to fix the led-out sensor signal wire 14.

Figure 8:
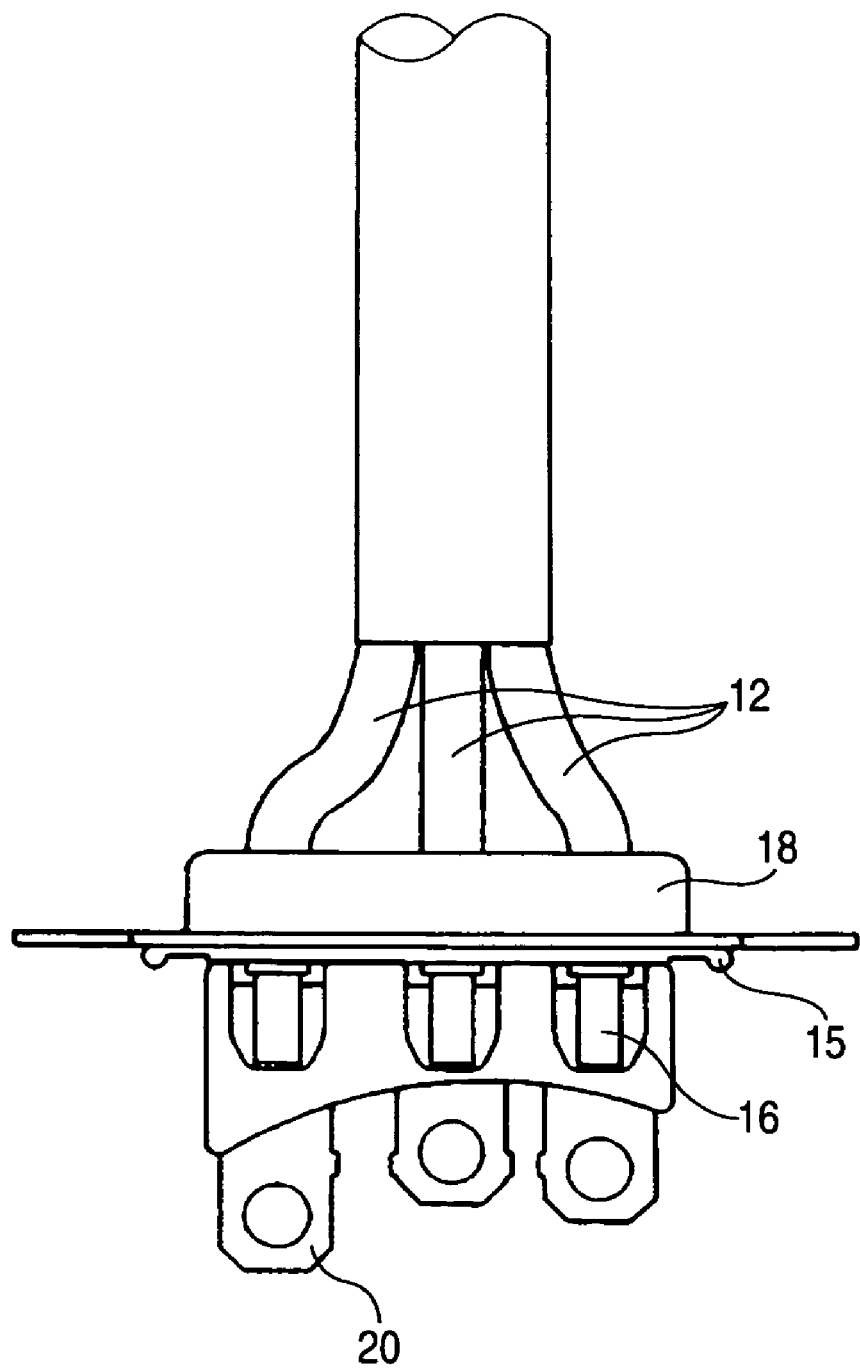
FIG. 8 is a front view of an assembly of respective phase lead wires showing Embodiment 1 of the invention.

FIG. 8 is a front view of an assembly of the respective phase lead wires integrated after the steps of FIGS. 5 to 7. After the steps of FIGS. 5 to 7, integration is carried out by using the previously prepared assembly of the respective phase lead wires as shown by FIG. 8. The front end portion 16 is attached with the connection terminal 20 by welding, and other ends of the respective phase lead wires 12 are attached with the connector connected to a side of the control circuit. The brushless motor 1 as shown by FIG. 1 is integrated by carrying out a step of introducing the front end portions 16 of the respective phase lead wires 12 from outside the opening portion 17 of the bracket 7 to inside the bracket 7 and electrically connecting the front end portions 16 to the stator winding 4 from outside the bracket 7. There is provided a step of inserting the respective phase lead wires 12 into the grommet 15, introducing the front end portions 16 of the respective phase lead wires 12 to inside the bracket 7 through the opening portion 17 provided at the bracket 7 and arranging the grommet 15 to close the opening portion 17 from outside the bracket 7 and fixing the grommet to the opening portion 17 from outside the bracket 7 by the cover 18.

Next, operation of Embodiment 1 constituted in this way will be explained. According to the brushless motor 1 for an electric power steering apparatus, based on a signal of a steering torque sensor or the like of steering and a signal of the rotation sensor 13 provided at the brushless motor 1, predetermined electricity conduction is carried out at the stator winding 4 by way of the respective phase lead wires 12 by the control circuit, not illustrated, the shaft 10 is rotated by electromagnetic operation of the stator 5 and a permanent magnet provided at the rotor 11, a rotational force thereof drives the driven shaft 24 by way of the boss 26 to be able to assist a steering force of steering. Further, as the brushless motor 1 for the electric power steering apparatus, there is requested a small-sized and inexpensive motor having a voltage of 12V, a conducted current of about 80 A, particularly reducing noise and vibration and having excellent waterproof performance.

As described above, according to Embodiment 1, the respective phase lead wires 12 and the sensor signal wires 14 are led out from portions of the bracket 7 different from each other, the respective phase lead wires 12 are constituted such that the front end portions 16 are introduced from outside the opening portion 17 provided at the bracket 7 to inside the bracket 7 to be able to be electrically connected to the stator winding 4 from outside the bracket 7 and therefore, after covering the essential portion of the brushless motor 1 by the frame 2 and the bracket 7, the respective phase lead wires 12 can be integrated from outside the brushless motor 1 and therefore, there can be provided an inexpensive rotating electric machine having excellent productivity such that the respective phase lead wires 12 do not constitute a hazard of integration at middle steps of integration, integrating operability of the brushless motor 1 is promoted, and parts can commonly be used since the respective phase lead wires 12 can simply be interchanged from outside the brushless motor 1. Further, at the same time, since the respective phase lead wires 12 and the sensor signal wires 14 are led out from portions of the bracket 7 different from each other and therefore, the sensor signal wires 14 are not influenced by a state of arranging the respective phase lead wires 12, and waterproof performance of portions of the sensor signal wires 14 for leading out the lead wires can be promoted. Further, the sensor signal wires 14 can be made to be difficult to be influenced by electric noise from the respective phase lead wires 12. Further, although in a constitution of connecting the lead wires at outside the rotating electric machine, insulation and waterproof of the connecting portion, or a new connector or the like are needed, the respective phase lead wires 12 are introduced to inside the bracket 7 to be connected and therefore, insulation and waterproof are facilitated, a new connector or the like is not added, an increase in insulating portions or connecting portions can also be restrained to be able to inexpensively constitute the brushless motor.

Further, the respective phase lead wires 12 are inserted into the grommet 15, the front end portions 16 of the respective phase lead wires 12 are introduced to inside the bracket 7 through the opening portion 17 provided at the bracket 7, the grommet 15 is arranged to close the opening portion 17 from outside the bracket 7 and is fixed to the opening portion 17 from outside the bracket 7 by the cover 18 and therefore, after integrating the essential portion of the brushless motor 1, the respective phase lead wires 12, the grommet 15 and the cover 18 can simply be integrated from outside the brushless motor 1 to promote the productivity, and the portions of leading out the respective phase lead wires 12 are firmly fixed to be able to promote also waterproof performance of the portion.

Further, the front end portions 16 of the respective phase lead wires 12 introduced to inside the bracket 7 include the connecting terminals 20, the connecting terminals 20 are electrically connected to the relay board 21 arranged at side of the bracket 7 and connected to the stator winding 4 from outside the bracket 7 by the screws 23 through the screwed holes 22 provided at the bracket 7 and therefore, it is not necessary to disintegrate the brushless motor 1 by detaching the bolts 30 or the like, and the respective phase lead wires 12 can be attached or interchanged simply from outside the brushless motor 1. Further, a connecting position is determined and integrating operability is promoted by the connection terminals 20 and the relay board 21, electric connection can be carried out inexpensively and firmly by the screws 23, further, also the interchange can easily be carried out.

The bracket 7 of the brushless motor 1 for the electric power steering apparatus is arranged by being fitted to the housing 25 containing the driven shaft 24 transmitted with the rotational force of the brushless motor 1, the screwed holes 22 provided at the bracket 7 are covered by the housing 25 and therefore, by normally mounting the brushless motor 1 to the housing 25, invasion of water or the like from the screwed holes 22 are simply be prevented.

The sensor signal wires 14 are inserted into the grommet 27 arranged at the notch portion 28 provided at the bracket 7 and led out the bracket 7, the grommet 27 is pressed in the axial direction by the frame 2 by fastening the bolt 30 for fixing the frame 2 to the bracket 7, pinched between the bracket 7 and the frame 2 to be fixed and therefore, the structure of fixing the portion of leading out the sensor signal wires 14 is simple, and the sensor signal wires 14 can be fixed in a normal step of fixing the frame 2 to the bracket 7 to be able to provide the apparatus having excellent productivity and excellent waterproof performance. The sensor signal wires 14 are provided with the comparatively slender wire diameter and excellent flexibility and therefore, even when the sensor signal wires 14 are integrated at a middle of the integrating step, the productivity is hardly deteriorated to be able to provide the inexpensive apparatus.

The sensor signal wires 14 are connected to the rotation sensor 13 by way of the connector 29 inside the bracket 7 and therefore, there can be provided the apparatus having excellent integrating operability of the sensor signal wires 14, facilitating to change the sensor signal wires 14, improving the productivity and improving also the waterproof performance since the connector 29 is disposed inside the bracket 7.

Both of the respective phase lead wires 12 and the sensor signal wires 14 are constituted by pluralities of lead wires, the lead wires are inserted to hole portions provided at the respective grommets (15, 27), respectively piece by piece and therefore, the respective phase lead wires 12 and the sensor signal wires 14 are not influenced by each other, single pieces of the lead wires are firmly held, and both of the respective phase lead wires 12, the sensor signal wires 14 can be constituted with excellent waterproof performance.

There are provided the step of leading out the sensor signal wires 14 from inside to outside the bracket 7, the step of covering inside the bracket 7 by the frame 2 and fixing the bracket 7 and the frame 2, and the step of introducing the front end portions 16 of the respective phase lead wires 12 from outside the opening portion 17 of the bracket 7 to inside the bracket 7 and electrically connecting the front end portions 16 to the stator winding 4 from outside the bracket 7 and therefore, after covering the essential portion of the brushless motor 1 by the frame 2 and the bracket 7, the respective phase lead wires 12 can be integrated from outside the brushless motor 1 and therefore, there can be provided the method of manufacturing the inexpensive rotating electric machine with excellent productivity in which the respective phase lead wires 12 do not constitute a hazard of integration in the middle steps of integration, integrating operability of the brushless motor 1 is promoted, large-sized formation of the integrating apparatus is restrained, further, parts can commonly be used and the like. Further, the respective phase lead wires 12 and the sensor signal wires 14 are led out from portions of the bracket 7 different from each other and therefore, the sensor signal wires 14 are not influenced by the state of arranging the respective phase lead wires 12, and waterproof performance of the portion of leading out the lead wires of the sensor signal wires 14 can be promoted.

There are provided the steps of inserting the respective phase lead wires 12 into the grommet 15, introducing the front end portions 16 of the respective phase lead wires 12 to inside the bracket 7 through the opening portion 17 provided at the bracket 7, arranging the grommet 15 to close the opening portion 17 from outside the bracket 7 and fixing the grommet 15 to the opening portion 17 from outside the bracket 7 by the cover 18 and therefore, the respective phase lead wires 12 can be integrated from outside the brushless motor 1 to promote the productivity, and waterproof performance of the portion of leading out the respective phase lead wires 12 can be promoted.

Further, although in the above-described embodiment, an explanation has been given of the brushless motor, naturally, the rotating electric machine may be a generator or the like, the rotation sensor may be an optical encoder or the like.

What is claimed is:

1. A rotating electric machine comprising:
    a stator having a stator core fixed inside a bottomed frame and a stator winding wound around the stator core;
    a bracket fixed to an opening side of the frame;
    a rotor having a shaft penetrating the bracket and rotatably supported by a bracket side bearing fixed to the bracket and by a frame side bearing arranged at the frame, the rotor being arranged inside the stator core interposing a gap therebetween;
    a respective phase lead wire electrically connected to the stator winding and led out from the bracket;
    a rotation sensor fixed to the bracket that detects a rotational position of the rotor; and
    a sensor signal wire connected to the rotation sensor and led out from the bracket, wherein
    the respective phase lead wire and the sensor signal wire are led out from portions of the bracket different from each other, and
    a front end portion of the respective phase lead wire is introduced to inside the bracket from outside an opening portion provided at the bracket, thereby electrically connecting to the stator winding from outside the bracket,
    wherein the respective phase lead wire is inserted though a grommet, the front end portion thereof being introduced to inside the bracket though the opening portion provided at the bracket, and
    the grommet is arranged to close the opening portion from outside the bracket and is fixed to the opening portion from outside the bracket by a cover.

2. The rotating electric machine according to claim 1, wherein
    the front end portion of the respective phase lead wire introduced to inside the bracket includes a connection terminal, which is electrically connected to a relay board by a screw from outside the bracket though a screwed hole provided at the bracket, the relay board being arranged inside the bracket and connected to the stator winding.

3. The rotating electric machine according to claim 2, wherein
    the rotating electric machine is a brushless motor for an electric power steering apparatus,
    the bracket of the brushless motor is arranged by being fitted to a housing, which contains a driven shaft transmitted with a rotational force of the brushless motor, and
    the screwed hole provided at the bracket is covered by the housing.

4. The rotating electric machine according to claim 1, wherein
    the sensor signal wire is inserted through a grommet arranged at a notch portion provided at the bracket, to be led out from the bracket, and
    the grommet is pressed in an axial direction by fastening a bolt for fixing the frame to the bracket and is pinched between the bracket and the frame.

5. The rotating electric machine according to claim 1, wherein
    the sensor signal wire is connected to the rotation sensor through a connector inside the bracket.

6. The rotating electric machine according to claim 1, wherein
the respective phase lead wire and the sensor signal wire include a plurality of lead wires, and
the lead wires are inserted into hole portions provided at the grommets respectively piece by piece.

7. A method of manufacturing a rotating electric machine, which includes:
a stator having a stator core fixed inside a bottomed frame and a stator winding wound around the stator core;
a bracket fixed to an opening side of the frame;
a rotor having a shaft penetrating the bracket and rotatably supported by a bracket side bearing fixed to the bracket and by a frame side bearing arranged at the frame, the rotor being arranged inside the stator core interposing a gap therebetween;
a respective phase lead wire electrically connected to the stator winding and led out from an opening portion of the bracket;
a rotation sensor fixed to the bracket that detects a rotational position of the rotor; and
a sensor signal wire connected to the rotation sensor and led out from a portion of the bracket different from the portion from which the respective phase lead wire is led out,
the method comprising:
a step of leading out the sensor signal wire from inside to outside the bracket through the portion of the bracket different from the portion from which the respective phase lead wire is led;
a step of covering inside the bracket by the frame and fixing the bracket and the frame; and
a step of introducing a front end portion of the respective phase lead wire from outside the opening portion of the bracket to inside the bracket through the portion of the bracket from which the respective phase lead wire is led out, and electrically connecting the front end portion to the stator winding from outside the bracket.

8. The method of manufacturing a rotating electric machine according to claim 7, further comprising:
a step of inserting the respective phase lead wire through a grommet, introducing the front end portion of the respective phase lead wire to inside the bracket through the opening portion provided at the bracket, arranging the grommet to close the opening portion from outside the bracket, and fixing the grommet to the opening portion from outside the bracket by a cover.

* * * * *